US012319066B2

(12) United States Patent
Kozuka

(10) Patent No.: US 12,319,066 B2
(45) Date of Patent: Jun. 3, 2025

(54) LIQUID STORAGE UNIT AND LIQUID EJECTION APPARATUS

(71) Applicant: CANON KABUSHIKI KAISHA, Tokyo (JP)

(72) Inventor: Yuki Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 18/193,022

(22) Filed: Mar. 30, 2023

(65) Prior Publication Data

US 2023/0321992 A1 Oct. 12, 2023

(30) Foreign Application Priority Data

Apr. 6, 2022 (JP) ................................. 2022-063314

(51) Int. Cl.
*B41J 2/175* (2006.01)

(52) U.S. Cl.
CPC ....... *B41J 2/17523* (2013.01); *B41J 2/17513* (2013.01); *B41J 2002/17516* (2013.01)

(58) Field of Classification Search
CPC ................ B41J 2/17523; B41J 2/17513; B41J 2002/17516; B41J 2/17503; B41J 2/01; B41J 2/17536; B41J 2/17553
USPC ........................................................... 347/86
See application file for complete search history.

(56) References Cited

U.S. PATENT DOCUMENTS

2009/0207218 A1* 8/2009 Kimura ................ B41J 2/17553 347/86
2020/0122471 A1 4/2020 Hirata et al.

FOREIGN PATENT DOCUMENTS

JP 2020-066137 4/2020

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

An object is to provide a liquid storage unit capable of suppressing damage to a gusset portion. The liquid storage unit has a liquid storage portion internally storing liquid, a gusset portion formed along the liquid storage portion and at which a lateral face unit of the liquid storage portion is folded toward the inside of the liquid storage portion, and a stopper unit configured to suppress a bend likely to occur at the gusset portion by coming into contact with another part.

8 Claims, 9 Drawing Sheets

LIQUID STORAGE UNIT AND LIQUID EJECTION APPARATUS

BACKGROUND OF THE INVENTION

Field of the Invention

The present disclosure relates to a liquid storage unit and a liquid ejection apparatus.

Description of the Related Art

Japanese Patent Laid-Open No. 2020-066137 has disclosed an outer casing unit configured to internally store a liquid storage unit and protect the liquid storage unit from impacts and the like exerted from the outside. Further, Japanese Patent Laid-Open No. 2020-066137 has disclosed a liquid storage unit configured to be stored in the outer casing unit while a gusset portion being bent toward the inside of the liquid storage unit by a pressing unit of the outer casing unit.

By the configuration of Japanese Patent Laid-Open No. 2020-066137, a configuration has been proposed in which damage to the gusset portion is suppressed by preparing a dedicated outer casing unit configured to store the liquid storage unit and containing the liquid storage unit in the outer casing unit so that the gusset portion of the liquid storage unit is pressed against the pressing unit of the outer casing unit.

Consequently, an object of the technique according to the present disclosure is to provide a liquid storage unit capable of suppressing damage to the gusset portion without using a dedicated product.

SUMMARY OF THE INVENTION

In order to achieve the above-described object, the liquid storage unit according to the present disclosure includes: a liquid storage portion internally storing liquid; a gusset portion formed along the liquid storage portion and at which a lateral face unit of the liquid storage portion is folded toward the inside of the liquid storage portion; and a stopper unit configured to suppress a bend likely to occur at the gusset portion by coming into contact with another part.

Further features of the present invention will become apparent from the following description of exemplary embodiments with reference to the attached drawings.

DESCRIPTION OF THE EMBODIMENTS

First Embodiment

<Liquid Ejection Apparatus>

Figure 1:
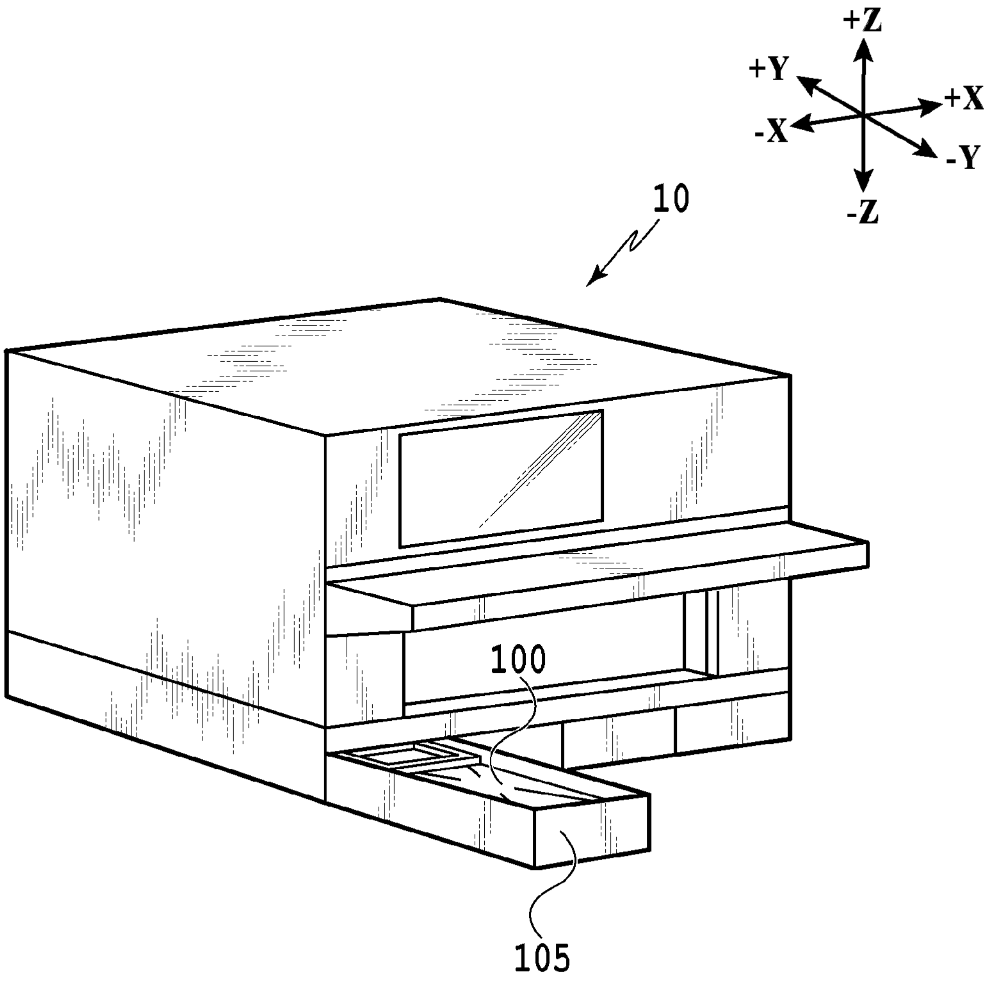
FIG. 1 is a schematic perspective diagram showing an outer appearance configuration of a liquid ejection apparatus.

FIG. 1 is a schematic perspective diagram showing an outer appearance configuration of a liquid ejection apparatus 10 configurating a liquid ejection system. In FIG. 1, an arrow X, an arrow Y, and an arrow Z indicating three directions perpendicular to one another are shown schematically. The arrow X, the arrow Y, and the arrow Z are appropriately shown schematically also in each of other drawings that are referred to in the present specification so as to correspond to FIG. 1.

The directions indicated by the arrow X, the arrow Y, and the arrow Z correspond to the arrangement and posture of the liquid ejection apparatus 10 and a liquid storage unit 100 in a case where they are in the normal use state. The normal use state of the liquid ejection apparatus 10 is a state in a case where the liquid ejection apparatus 10 is arranged on a horizontal plane and used. In the following, the directions indicated by the arrow X, the arrow Y, and the arrow Z are called "X-direction", "Y-direction", and "Z-direction", respectively. In each X-direction, one direction is called "+X-direction" and the opposite direction of the +X-direction is called "−X-direction". In each Y-direction, one direction is called "+Y-direction" and the opposite direction of the +Y-direction is called "−Y-direction". In each Z-direction, one direction is called "+Z-direction" and the opposite direction of the +Z-direction is called "−Z-direction".

The X-direction, the Y-direction, and the Z-direction are explained in order of the Z-direction, the Y-direction, and the X-direction. The Z-direction indicates a direction parallel to the direction of gravity. The −Z-direction is the direction of gravity and the +Z-direction is the opposite direction of gravity. The Z-direction matches the up-down direction (height direction) of the liquid ejection apparatus 10. In the following explanation, in a case where "up" or "down" is referred to with respect to the liquid ejection apparatus 10 and the liquid storage unit 100, unless stated particularly, the up-down direction with the direction of the arrow Z being taken as a reference is meant and "up" means the +Z-direction and "down" means the −Z-direction. Further, the "horizontal direction" means the direction perpendicular to the Z-direction.

The Y-direction indicates a mounting and detaching direction of the liquid storage unit 100 in the liquid ejection apparatus 10 and matches a direction parallel to the forward-rearward direction (depth direction) of the liquid ejection apparatus 10. The +Y-direction indicates a mounting direction of a mounting unit 105 including the liquid storage unit 100 for the liquid ejection apparatus 10 and matches a direction from the front face side toward the rear face side of the liquid ejection apparatus 10. The −Y-direction indicates a detaching direction of the mounting unit 105 from the liquid ejection apparatus 10 and matches a direction from the rear face side toward the front face side of the liquid ejection apparatus 10. In the following explanation, in a case where "front" or "rear" is referred to with respect to the liquid ejection apparatus 10 and the liquid storage unit 100, unless stated particularly, the forward-rearward direction with the direction of the arrow Y being taken as a reference is meant and "front" means the +Y-direction and "rear" means the −Y-direction.

The X-direction indicates a direction parallel to the left-right direction (width direction) of the liquid ejection apparatus 10. The −X-direction matches a direction from the right side toward the left side in a case of facing directly the front face of the liquid ejection apparatus 10 and on the contrary, the +X-direction matches a direction from the left side toward the right side. In the following explanation, in a case where "right" or "left" is referred to with respect to the liquid ejection apparatus 10 and the liquid storage unit 100, unless stated particularly, the left- and right direction with the direction of the arrow X being taken as a reference is meant and "right" means the +X-direction and "left" means the −X-direction.

In the present embodiment, the liquid ejection apparatus 10 is an ink jet printer and the liquid ejection system is an ink jet printing system. The liquid that is consumed by ejection in the liquid ejection apparatus 10 of the present embodiment is ink. The ink may be, for example, a pigment ink. The liquid ejection apparatus 10 forms an image by ejecting ink droplets and printing the ink dots on a printing-target medium. The processing-target medium is, for example, a printing sheet.

The liquid storage unit 100 in the present embodiment is a storage unit configured to store ink to be ejected in the liquid ejection apparatus 10. By mounting the liquid storage unit 100 to the liquid ejection apparatus 10, the liquid storage unit 100 is connected to a liquid introduction unit inside the liquid ejection apparatus 10 and ink is supplied to an ejection execution unit by a pump.

<Assembled State of Case 61 and Liquid Storage Unit 100>

Figure 2:
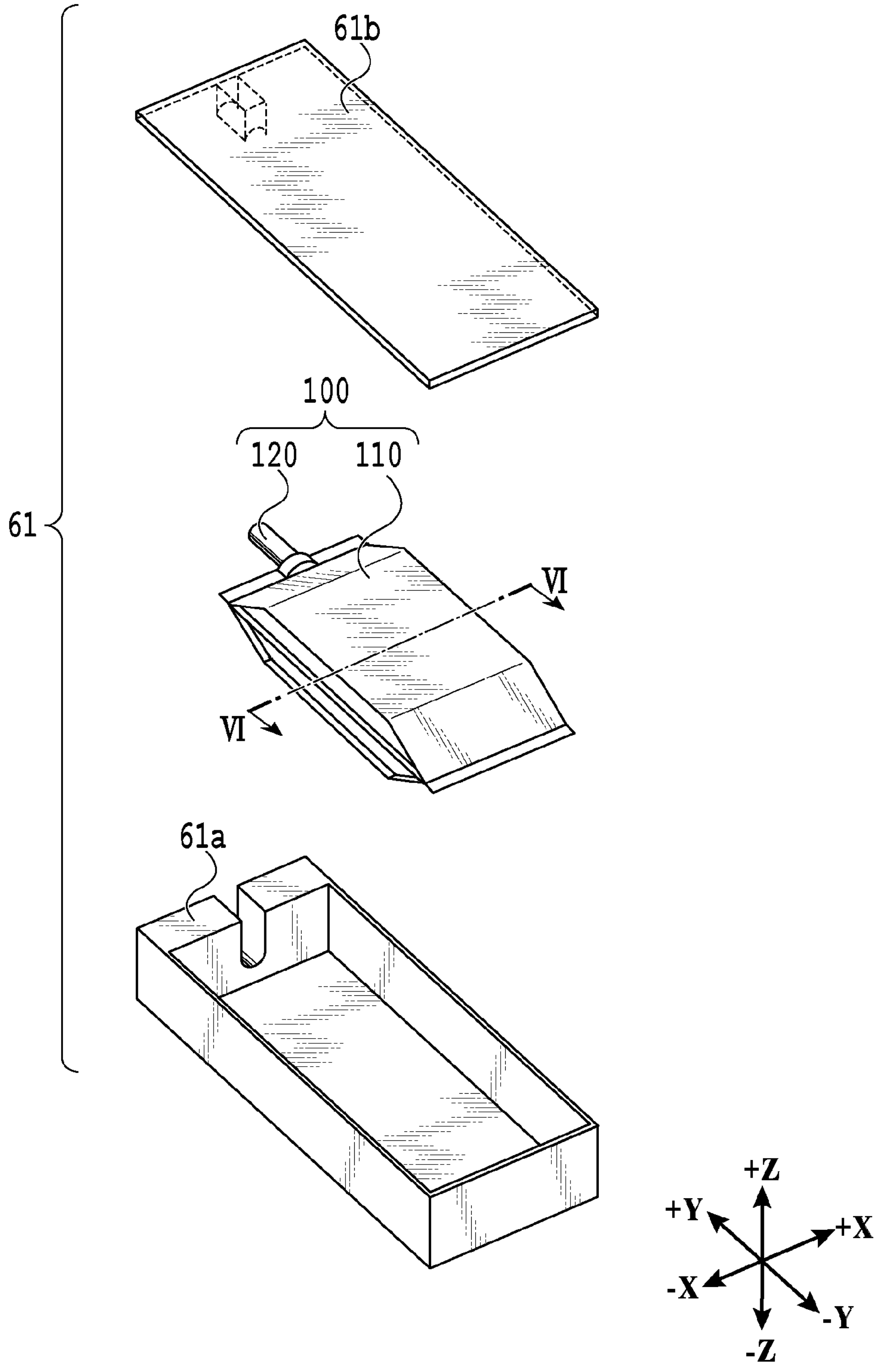
FIG. 2 is a schematic exploded perspective diagram showing a stage in which a case and a liquid storage unit are assembled.

FIG. 2 is a schematic exploded perspective diagram showing a stage in which a case 61 and the liquid storage unit 100 are assembled. In the following, first, the schematic configuration of the case 61 is explained and after that, the schematic configuration of the liquid storage unit 100 is explained.

<Case 61>

The case 61 stores the liquid storage unit 100 inside thereof and protects the liquid storage unit 100 against impacts exerted from the outside at the time of transportation and the like of the liquid storage unit 100.

The case 61 has the shape of an approximate rectangular parallelepiped whose Y-direction is the longitudinal direction. Further, the case 61 includes a case main body 61*a* that is formed as a hollow box opening in the +Z-direction and in the +Y-direction and a case upper lid 61*b*. The case is manufactured by a resin member, for example, such as polypropylene.

In a case where the distribution efficiency and the size of the liquid ejection apparatus 10 are taken into consideration, it is preferable for the size of the inside of the case 61 and the size of the liquid storage unit 100 to be substantially the same. However, the manufacturing tolerance of each of them, the clearance in a case where the liquid storage unit 100 is inserted into the inside of the case 61, and the like are taken into consideration.

<Liquid Storage Unit 100>

In the present embodiment, the liquid storage unit 100 is an ink pack. The liquid storage unit 100 has a bag unit 110 and a connecting member 120. Further, the liquid storage unit 100 is a gusset-type ink pack including a plurality of films. The bag unit 110 is a storage unit inside which a liquid storage portion storing liquid is configured. The bag unit 110 has flexibility. The degree of flexibility of the bag unit 110 may be a degree at which the bag unit 110 bends by its own weight or a degree at which the shape of the bag unit 110 is maintained against its own weight but the bag unit 110 bends in a case where a load greater than its own weight is exerted. The shape of the bag unit 110 is an approximate rectangle with the Y-direction being its longitudinal direction in a case where the bag unit 110 is viewed from the Z-direction. The bag unit 110 is combined by overlapping at least four sheet members and welding or bonding the outer circumferential end portion of each sheet member.

The sheet member is formed by a material having flexibility, gas barrier properties, and liquid non-penetrating properties. Each sheet member may include a film member, for example, such as polyethylene terephthalate (PET), nylon, and polyethylene. Each sheet member may include a plurality of laminated films including the material described previously. In this case, it may also be possible to form the outer layer by a PET or nylon film excellent in impact resistance and form the inner layer by a polyethylene film excellent in resistance to ink. Further, it may also be possible to add a layer deposited with aluminum or the like to the laminate structure.

The connecting member 120 is attached to the end portion on the side in the +Y-direction of the bag unit 110. The connecting member 120 is fixed at the end portion on the tip side (side in the +Y-direction) in the mounting direction of the mounting unit 105. The connecting member 120 has a function to connect to a connection reception unit of the corresponding liquid ejection apparatus 10 and a function to fix the liquid storage unit 100 to the case 61. The outline of the outer appearance of the connecting member 120 is explained. The shape of the connecting member 120 is an approximate rectangular parallelepiped with the X-direction being taken as the longitudinal direction. The width in the X-direction of the connecting member 120 is less than the width in the X-direction of the bag unit 110. The main body portion of the connecting member 120 is manufactured by forming a resin member, for example, such as polypropylene.

<Liquid Storage Unit 100>

Figure 3:
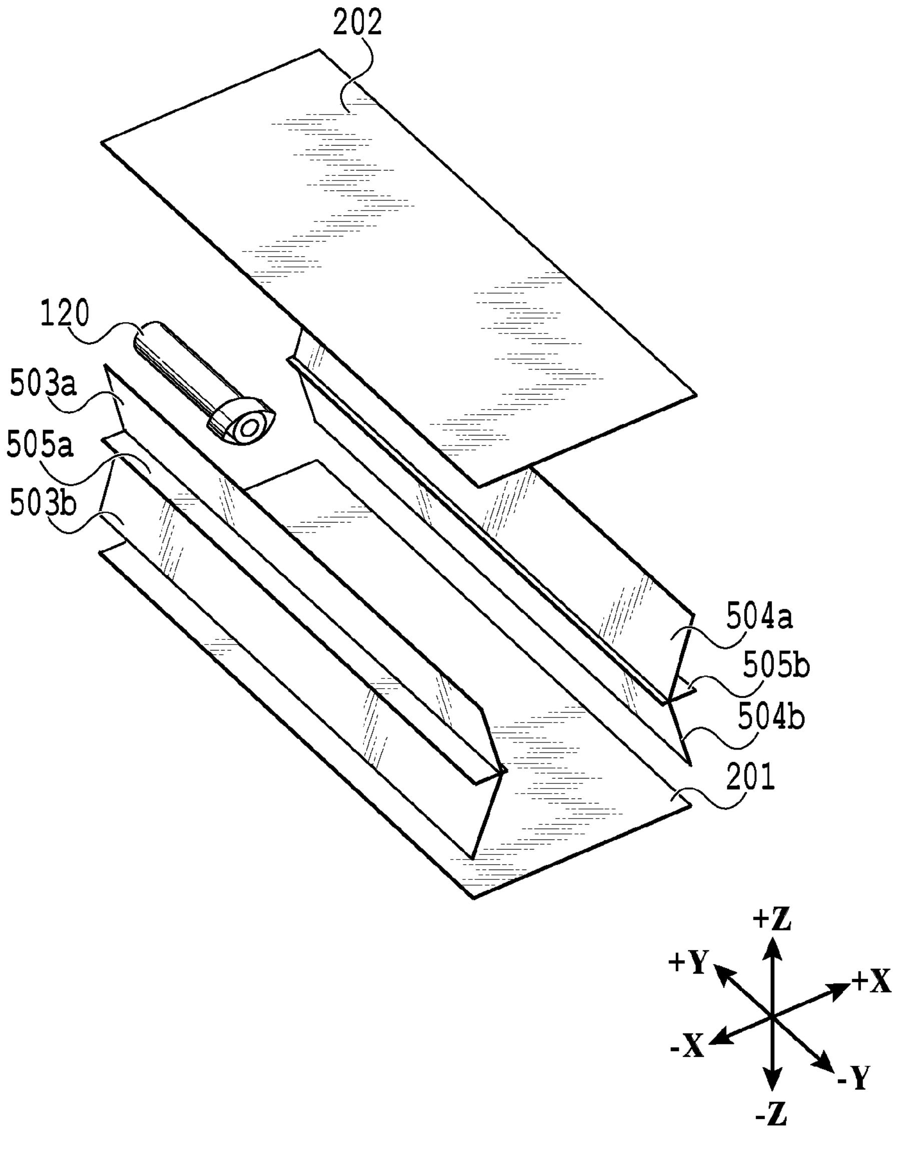
FIG. 3 is a schematic perspective diagram showing a configuration of the liquid storage unit.

FIG. 3 is a schematic perspective diagram showing the configuration of the liquid storage unit 100 according to the present embodiment.

The bag unit 110 has a bottom face portion 201, a top face portion 202, a first lateral face member 503*a*, a second lateral face member 503*b*, a first stopper member 505*a*, a third lateral face member 504*a*, a fourth lateral face member 504*b*, and a second stopper member 505*b*. The end portion on the side in the +X-direction in the longitudinal direction of the first stopper member 505*a* is nipped and joined between the first lateral face member 503*a* and the second lateral face member 503*b*. The end portion on the side in the −X-direction in the longitudinal direction of the second stopper member 505*b* is nipped and joined between the third lateral face member 504*a* and the fourth lateral face member 504*b*.

The bottom face portion 201 is a bottom face member that is arranged in the −Z-direction (that is, at the bottom face position). The top face portion 202 faces the bottom face portion 201. The top face portion 202 is a top face member that is arranged in the +Z-direction of the bottom face portion 201 (that is, at a position higher than the bottom face portion 201). The first lateral face member 503*a* is a lateral face member that connects one end portion of the top face portion 202 and one end portion of the first stopper member 505*a*. The second lateral face member 503*b* is a lateral face member that connects one end portion of the first stopper member 505*a* and one end portion of the bottom face portion 201. The third lateral face member 504*a* is a lateral face member that connects the other end portion of the top face portion 202 and one end portion of the second stopper member 505*b*. The fourth lateral face member 504*b* is a lateral face member that connects one end portion of the second stopper member 505*b* and the other end portion of the bottom face portion 201. In the following, in a case where it is not necessary to particularly distinguish between the first lateral face member 503*a*, the second lateral face member 503*b*, the third lateral face member 504*a*, and the fourth lateral face member 504*b*, they are each referred to simply as a "lateral face unit". Further, in a case where it is not necessary to particularly distinguish between the first stopper member 505*a* and the second stopper member 505*b*, they are each referred to simply as a "stopper unit". The lateral face unit bends in accordance with a change in the amount of liquid within the liquid storage unit 100. The liquid storage unit 100 has a gusset portion formed along the bag unit 110 and at which the lateral face unit of the bag unit 110 is folded toward the side of the bag unit 110. The stopper unit suppresses a bend that may occur at the gusset portion (that is, lateral face unit) by coming into contact with another part (for example, the case main body 61*a*).

In a case where an impact is exerted on the liquid storage unit 100 from the outside of the case 61 (see FIG. 2) in the liquid storage unit 100, it may happen sometimes that the liquid swings inside the liquid storage unit 100. By the liquid swinging inside the liquid storage unit 100, the lateral face unit bends. In a case where the lateral face unit bends repeatedly, a fatigue accumulates at the lateral face unit. Due to this, there is a possibility that the lateral face unit is damaged.

Further, in a case where the liquid inside the liquid storage unit 100 swings, particularly in the X-direction, it may happen sometimes that the inner wall face of the case 61 and the lateral face unit come into contact with each other. In this case, it may happen sometimes that the surface of the lateral face unit is scraped or a crack or the like occurs on the surface of the lateral face unit. That is, in a case where the inner wall face of the case 61 and the lateral face unit come into contact with each other, there is a possibility that the lateral face unit (that is, the gusset portion) is damaged.

Consequently, the liquid storage unit 100 according to the present embodiment has a stopper unit 505 configured to suppress a bend of the lateral face unit.

<About Damage of Gusset Portion>

In order to make it easy to understand the stopper unit according to the present embodiment, first, the conventional liquid storage unit 100 is explained. The configuration the same as or corresponding to that of the liquid storage unit 100 according to the present embodiment is explained by using the same name and symbol.

Figure 4A:
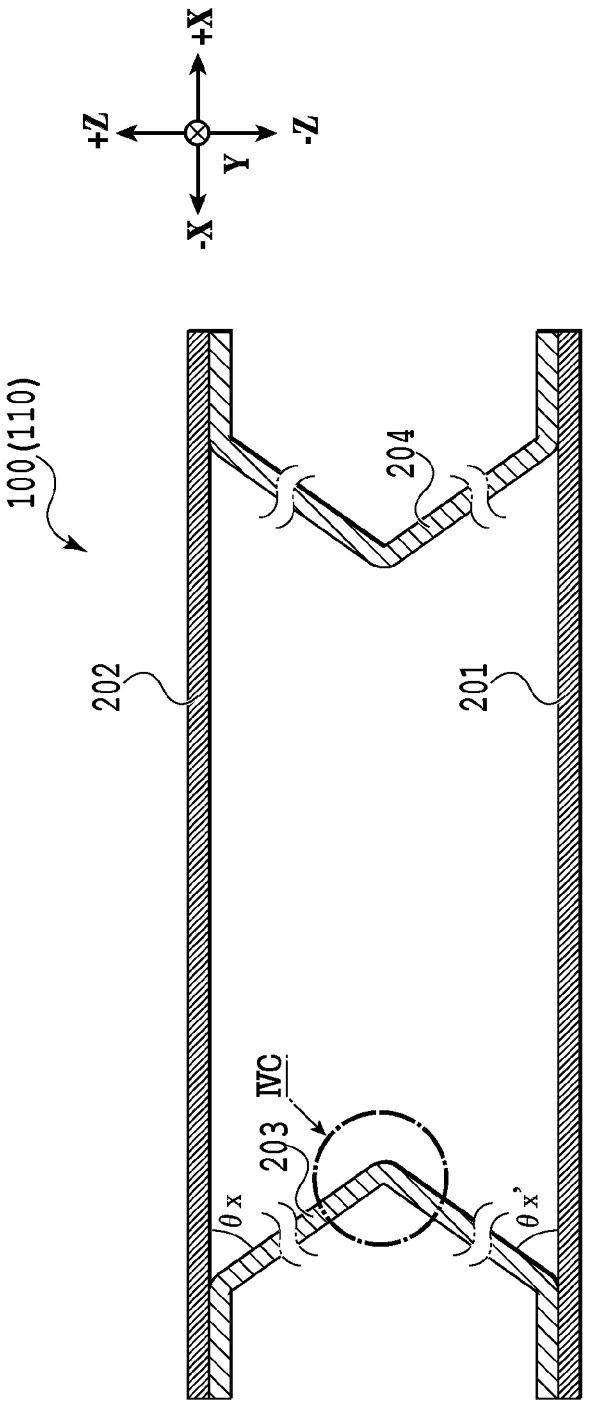
FIG. 4A is a cross-sectional diagram showing a configuration of a conventional liquid storage unit.
Figure 4B:
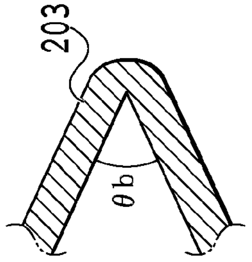
FIG. 4B is a schematic enlarged diagram showing the way an area c indicated by a one-dot chain line is bent.
Figure 4C:
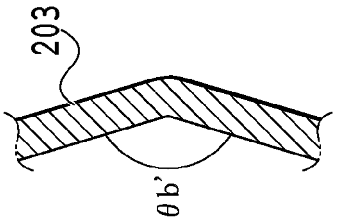
FIG. 4C is a schematic enlarged diagram showing the way the area c indicated by the one-dot chain line in FIG. 4A is stretched.

FIG. 4A and FIG. 4B are each a diagram showing the configuration of the conventional liquid storage unit 100. FIG. 4A is a schematic cross-sectional diagram of the conventional bag unit 110. As shown in FIG. 4A, the conventional bag unit 110 has the bottom face portion 201 and the top face portion 202. The conventional bag unit 110 has a lateral face member 203 configured to connect one end portion of the bottom face portion 201 and one end portion of the top face portion 202 and a lateral face member 204 configured to connect the other end portion of the bottom face portion 201 and the other end portion of the top face portion 202. Each portion in the conventional bag unit 110 is joined by thermal welding and the like. Further, it is also possible for the conventional lateral face member to function as a gusset portion. FIG. 4B is a schematic enlarged diagram showing the way the area c indicated by the one-dot chain line in FIG. 4A is bent. FIG. 4C is a schematic enlarged diagram showing the way the area c indicated by the one-dot chain line in FIG. 4A is stretched.

At the conventional lateral face member, in a case where the liquid swings inside the bag unit 110 for some reason, for example, bending and stretching are repeated between an angle θb shown in FIG. 4B and an angle θb' shown in FIG. 4C. Due to this, the lateral face member is damaged and there is a possibility that the bent portion of the lateral face member unit is damaged.

Figure 5:
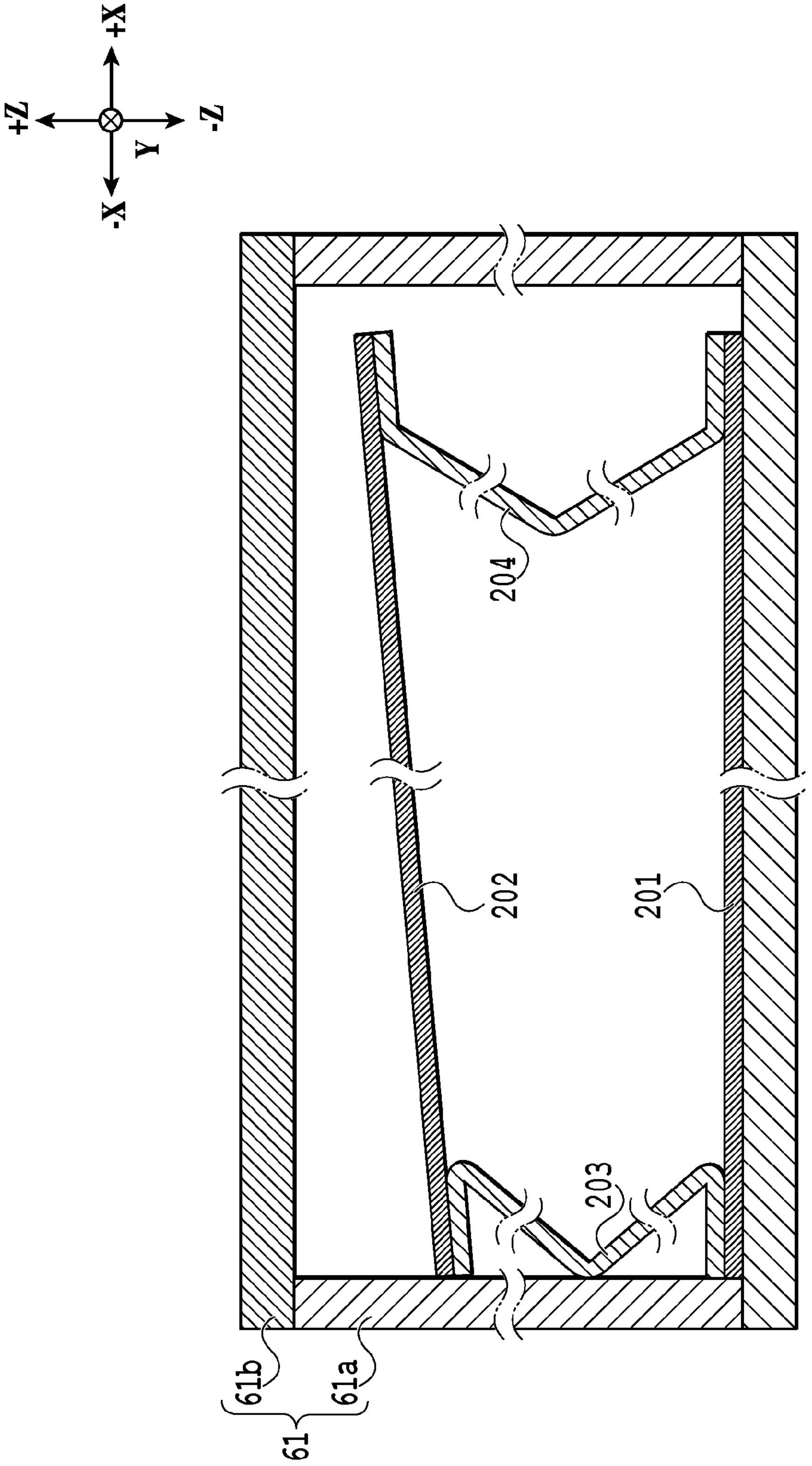
FIG. 5 is a diagram showing an example of the way a conventional gusset portion comes into contact with another part.

FIG. 5A is a diagram showing an example of the way the conventional gusset portion comes into contact with the inside of the sidewall in the case 61. In a case where an impact is exerted from the outside in a state where the liquid storage unit 100 is contained in the case 61, the liquid inside the liquid storage unit 100 swings. The lateral face member 203 and the lateral face member 204 are configured so that they are bent toward the inside as shown in FIG. 4A in the normal state. However, by the liquid swinging due to an external impact and the like, there is a case where a state is brought about where the lateral face member of the bag unit 110 (the lateral face member 203 in the example in FIG. 5) is bent in the opposite direction, that is, toward the outside. In a case where the state such as this is brought about where the lateral face member 203 is bent toward the outside, it may happen sometimes that the vertex of the gusset portion at the lateral face member 203 comes into contact with the inner wall of the case main body 61*a*. In a case where the gusset portion comes into contact with the inner wall of the case main body 61*a*, there is a possibility that a scrape, crack or the like occurs on the surface of the vertex at the gusset portion. That is, in a case where the gusset portion comes into contact with the inner wall of the case main body 61*a*, there is a possibility that the gusset portion is damaged. In the above, explanation is given by using the lateral face member 203, but the same state may occur at the lateral face member 204 and there is a case where the same state occurs at both the lateral face member.

<About Protection of Gusset Portion>

Figure 6A:
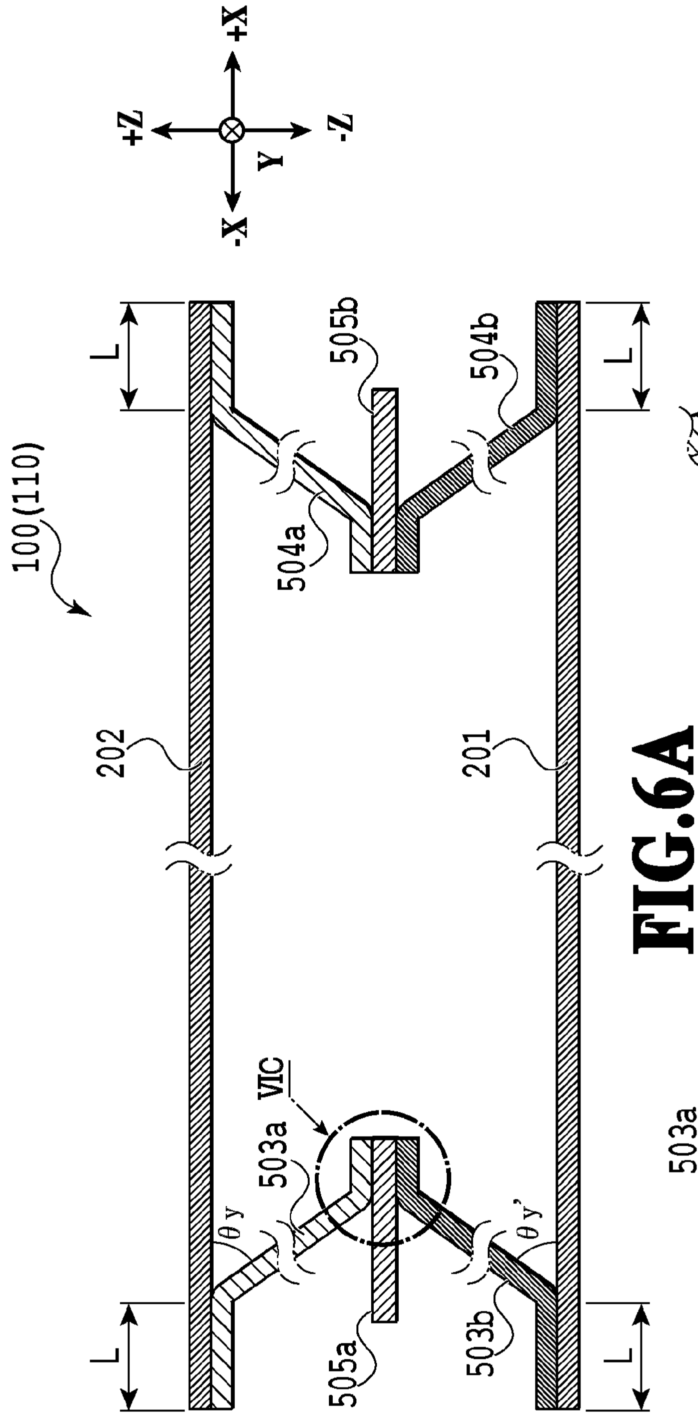
FIG. 6A is a diagram showing a configuration of a liquid storage unit according to the present embodiment, a cross-sectional diagram along a VI-VI line in FIG. 2.
Figure 6B:
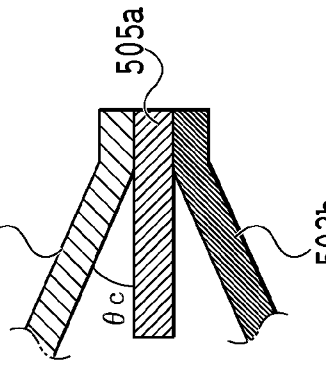
FIG. 6B is a schematic enlarged diagram showing the way an area c indicated by a one-dot chain line in FIG. 6A is bent.
Figure 6C:
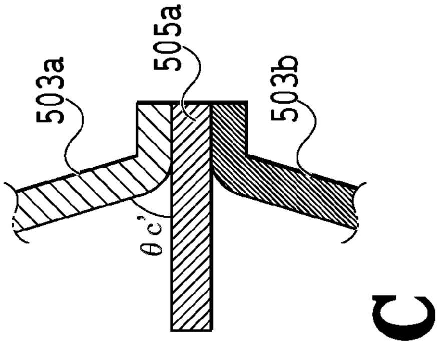
FIG. 6C is a schematic enlarged diagram showing the way the area c indicated by the one-dot chain line in FIG. 6A is stretched.

FIG. 6A to FIG. 6C are each a diagram showing the configuration of the liquid storage unit 100 according to the present embodiment. FIG. 6A is a cross-sectional diagram along the VI-VI line in FIG. 2. In the present embodiment, the other end portion of the first lateral face member 503*a*, one end portion of the first stopper member 505*a*, and the other end portion of the second lateral face member 503*b* are joined in advance. That is, the first stopper member 505*a* is nipped and joined between the first lateral face member 503*a* and the second lateral face member 503*b*. After that, one end portion of the top face portion 202, one end portion of the first lateral face member 503*a*, one end portion of the bottom face portion 201, and one end portion of the second lateral face member 503*b* are joined. On the other hand, at the lateral face unit on the opposite side, similarly the other end portion of the third lateral face member 504*a*, one end portion of the second stopper member 505*b*, and the other end portion of the fourth lateral face member 504*b* are joined in advance. After that, the other end portion of the top face portion 202, one end portion of the third lateral face member 504*a*, the other end portion of the bottom face portion 201, and one end portion of the fourth lateral face member 504*b* are joined. As one example of a method of performing the above-described joining, mention is made of thermal welding and the like. Then, in the present embodiment, the first lateral face member 503*a* and the second lateral face member 503*b* function as the gusset portion on one end side of the bag unit 110 Similarly, the third lateral face member 504*a* and the fourth lateral face member 504*b* function as the gusset portion on the other end side.

FIG. 6B is a schematic enlarged diagram showing the way the area c indicated by the one-dot chain line in FIG. 6A is bent. FIG. 6C is a schematic enlarged diagram showing the way the area c indicated by the one-dot chain line in FIG. 6A is stretched.

In a case where the change in angle at the conventional gusset portion and the change in angle at the gusset portion of the present embodiment are compared with reference to FIG. 4A to FIG. 6C, it is possible to express a relationship between the changes in angle by a formula below.

$$(\theta b'-\theta b)/2=\theta c'-\theta c \quad \text{(formula 1)}$$

However, this premises that a relationship expressed by formula below holds.

$$\theta x=\theta y \quad \text{(formula 2)}$$

$$\theta x'=\theta y' \quad \text{(formula 3)}$$

As described above, in the present embodiment, the change in angle at the gusset portion is reduced compared to that at the conventional gusset portion at which the gusset portion is bent in the opposite direction shown in FIG. 5 (formula (1) indicates that the change in angle is halved). That is, it can be said that the damage to the gusset portion is reduced compared to the past. One end portion (end portion on the side in the +X-direction) of the first stopper member 505*a* is nipped and joined between the other end portion (end portion on the side in the +X-direction) of the first lateral face member 503*a* and the other end portion (end portion on the side in the +X-direction) of the second lateral face member 503*b*. The area in which the first stopper member 505*a* and the first lateral face member 503*a* are joined is the same as the area in which the first stopper member 505*a* and the second lateral face member 503*b* are joined. The other end portion (end portion on the side in the −X-direction) of the first stopper member 505*a* is caused to protrude toward the outside (side in the −X-direction) from the joining surface of the first lateral face member 503*a*, the first stopper member 505*a*, and the second lateral face member 503*b*. The upper limit of the length by which the first stopper member 505*a* is caused to protrude is set to the length from the joining surface of the first lateral face member 503*a*, the first stopper member 505*a*, and the second lateral face member 503*b* to one end (end on the side in the −X-direction) of the top face portion 202 and the bottom face portion 201. It is preferable to set the lower limit of the length by which the first stopper member 505*a* is caused to protrude to the length equal to the width (length L in FIG. 6A) at the joining surface of the bottom face portion 201 and the second lateral face member 503*b*. The length of the joining surface of the top face portion 202 and the first lateral face member 503*a* is the same length (length L).

One end portion (end portion on the side in the −X-direction) of the second stopper member 505*b* is nipped and joined between the other end portion (end portion on the side in the −X-direction) of the third lateral face member 504*a* and the other end portion (end portion on the side in the −X-direction) of the fourth lateral face member 504*b*. The area in which the second stopper member 505*b* and the third lateral face member 504*a* are joined is the same as the area in which the second stopper member 505*b* and the fourth lateral face member 504*b* are joined. The other end portion (end portion on the side in the +X-direction) of the second stopper member 505*b* is caused to protrude toward the outside (side in the +X-direction) from the joining surface of the third lateral face member 504*a*, the second stopper member 505*b*, and the fourth lateral face member 504*b*. The upper limit of the length by which the second stopper member 505*b* is caused to protrude is set to the length from the joining surface of the third lateral face member 504*a*, the second stopper member 505*b*, and the fourth lateral face member 504*b* to the other end (end on the side in the +X-direction) of the top face portion 202 and the bottom face portion 201. It is preferable to set the lower limit of the length by which the second stopper member 505*b* is caused to protrude to the length equal to the width (length L in FIG. 6A) at the joining surface of the bottom face portion 201 and the fourth lateral face member 504*b*. The length of the joining surface of the top face portion 202 and the third lateral face member 504*a* is also the same length (length L).

<Effects of Causing Stopper Unit to Protrude from Inside of Bag Unit 110 Toward Outside>

Figure 7:
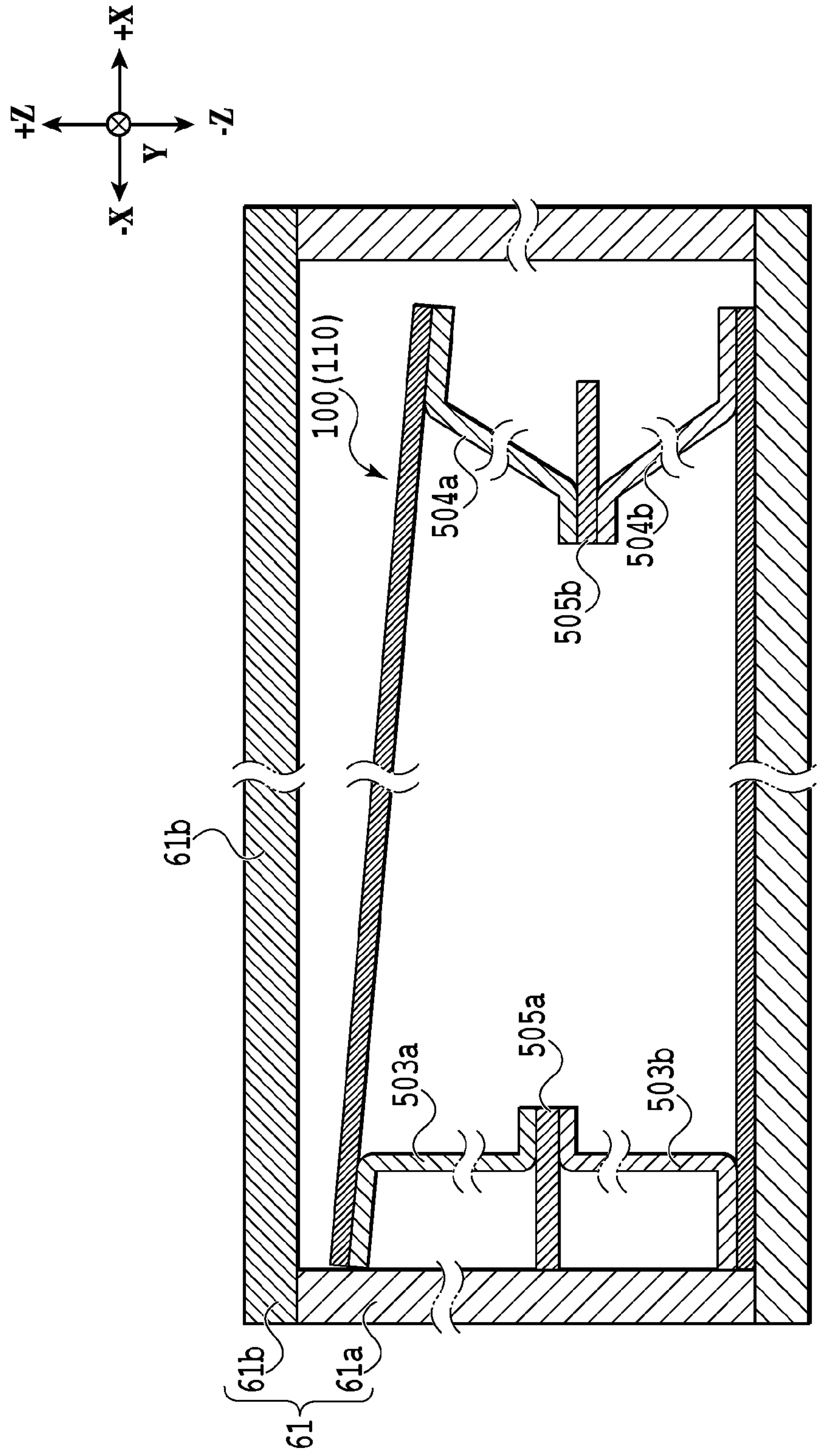
FIG. 7 is a schematic diagram showing the way a stopper unit protects a gusset portion.

FIG. 7 is a schematic diagram showing the way the stopper unit protects the gusset portion.

As shown in FIG. 7, in a case where the liquid storage unit 100 is contained in the case 61 and an impact is exerted from the outside, the liquid swings inside the bag portion 100. In the present embodiment, even though the liquid swings inside the bag unit 110, in a case where one of the gusset portions bends, the stopper member of the other gusset portion functions as a stopper and the other gusset portion is suppressed from coming into contact with the inner wall of the case main body 61*a*. In the example shown in FIG. 7, in a case where one of the gusset portions (third lateral face member 504*a* and fourth lateral face member 504*b*) bends, the first stopper member 505*a* of the other gusset portion (first lateral face member 503*a* and second lateral face member 503*b*) functions as a stopper. By the first stopper member 505*a* coming into contact with the inner wall of the case main body 61*a*, the first lateral face member 503*a* and the second lateral face member 503*b* are suppressed from coming into contact with the inner wall of the case main body 61*a*. That is, by the first stopper member 505*a*, the first lateral face member 503*a* and the second lateral face member 503*b* are protected. The stopper unit may be manufactured by the same material (for example, film) as that configuring the lateral face unit.

<Conclusion>

As described above, in the present embodiment, in a case where one of the gusset portions bends, the stopper unit of the other gusset portion comes into contact with the inner wall of the case main body 61*a*. Due to this, it is possible to reduce the fatigue that accumulates by the gusset portion repeating bending and the damage that occurs by the gusset portion coming into direct contact with the inner wall of the case main body 61*a*. Consequently, according to the liquid storage unit 100 of the present embodiment, it is possible to suppress the damage of the gusset portion without using a dedicated product. Further, by making the material configuring the stopper unit the same as that configuring the bag unit 110, it is possible to provide the liquid storage unit 100 whose cost is low. Furthermore, in a case where the material configuring the stopper unit includes a material whose hardness is higher than that configuring the bag portion, the rigidity increases compared to the case where the stopper unit and the bag unit 110 are manufactured by the same material, and therefore, reliability increases.

Second Embodiment

An object of the present embodiment is to provide the liquid storage unit 100 whose reliability is higher and whose cost is lower. In the following, explanation of the same configuration as that of the first embodiment is omitted by using the same symbol and points different from the first embodiment are explained mainly.

Figure 8:
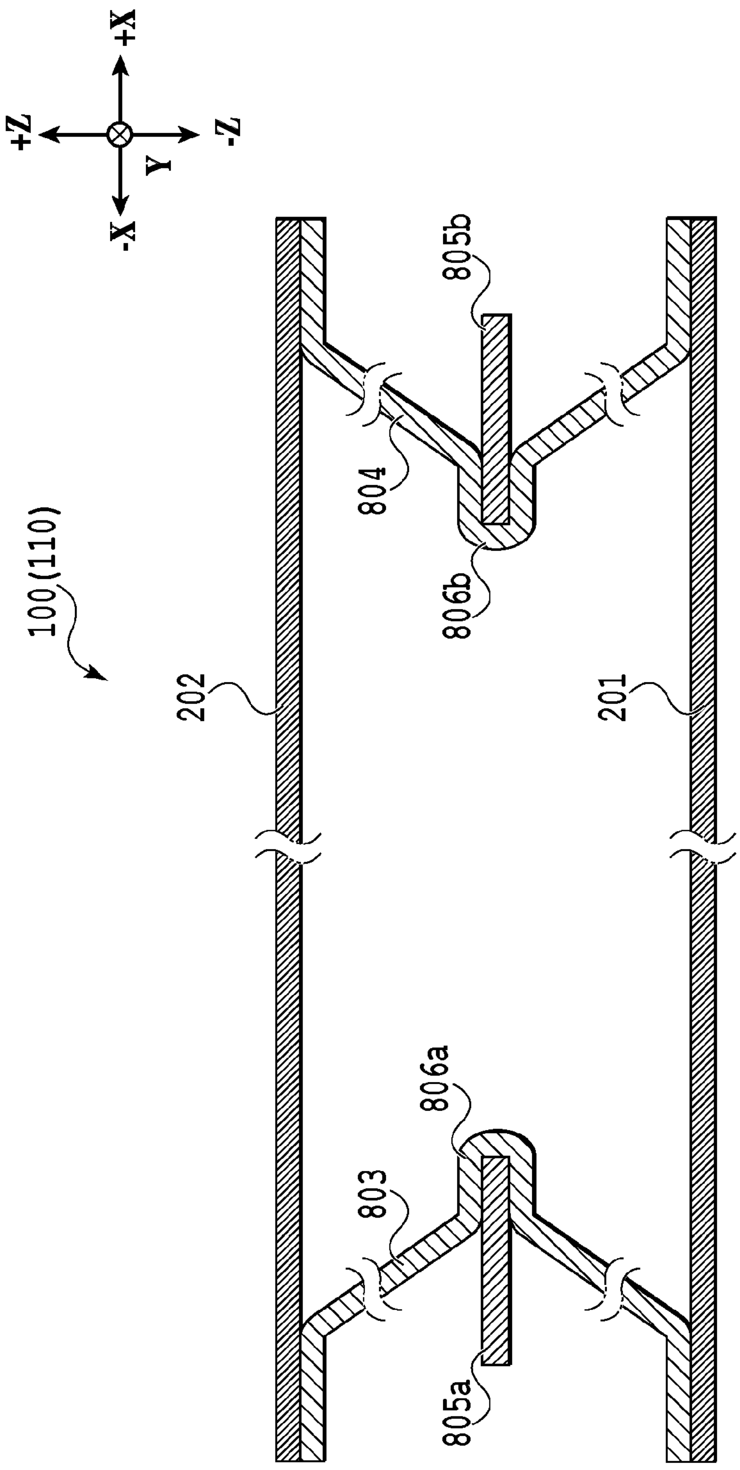
FIG. 8 is a schematic cross-sectional diagram of a liquid storage unit according to a second embodiment.

FIG. 8 is a schematic cross-sectional diagram of the liquid storage unit 100 according to the present embodiment. In the following, explanation is given on the assumption that the liquid storage unit 100 is cut along a cutting line corresponding to the VI-VI line in FIG. 2. As shown in FIG. 8, the bag unit 110 according to the present embodiment has a fifth lateral face member 803 and a sixth lateral face member 804.

The fifth lateral face member 803 has a third stopper member 805*a*. The sixth lateral face member 804 has a fourth stopper member 805*b*. In the present embodiment also, in a case where it is not necessary to particularly distinguish between the fifth lateral face member 803 and the sixth lateral face member 804, they are each referred to simply as a lateral face member. Similarly, in a case where it is not necessary to particularly distinguish between the third stopper member 805*a* and the fourth stopper member 805*b*, they are each referred to simply as a stopper member.

In the present embodiment, a joining margin is crated by folding back the lateral face member. Then, the stopper member is nipped inside the joining margin. By joining the stopper member nipped inside the joining margin, the stopper member is fixed to the lateral face member. After that, the top face portion 202 and the bottom face portion 201 are joined to the lateral face member. Specifically, the joining margin is created by folding back the fifth lateral face member 803. Then, the third stopper member 805*a* is nipped inside the joining margin. At the fifth lateral face member 803, the portion that nips and covers the third stopper member 805*a* is referred to as a first cover portion 806*a*. Similarly the joining margin is created by folding back the sixth lateral face member 804. Then, the fourth stopper member 805*b* is nipped inside the joining margin. At the sixth lateral face member 804, the portion that nips and covers the fourth stopper member 805*b* is referred to as a second cover portion 806*b*. In the following, in a case where it is not necessary to particularly distinguish between the first cover portion 806*a* and the second cover portion 806*b*, they are each referred to simply as a "cover portion".

According to the configuration such as this, in a case where the lateral face member and the stopper member are joined, even on a condition that a crack occurs resulting from trouble, the stopper member is covered by the cover portion from the inside of the stopper member. Because of this, it is possible to suppress a liquid from leaking through a gap in the joining face between the lateral face member and the stopper member. Further, even in a case where a joined portion between the lateral face member and the stopper member is damaged due to the repetition of bending of the lateral face member, it is similarly possible to suppress a liquid from leaking through a gap in the joining face between the lateral face member and the stopper member. Due to this, reliability is further improved compared to the first embodiment. Further, each lateral face member is configured by one member, and therefore, the cost is also reduced. As described above, in the present embodiment, by nipping the stopper member by the lateral face member and covering from the inside, it is possible to reduce the possibility of a liquid leaking from the joining face between the lateral face member and the stopper member. Consequently, according to the configuration of the present embodiment, it is possible to provide the liquid storage unit 100 whose reliability is higher and whose cost is lower.

Third Embodiment

An object of the present embodiment is to provide the liquid storage unit 100 whose reliability is still higher and whose cost is still lower. In the following, explanation of the same configuration as that of the first embodiment is omitted by using the same symbol and points different from the first embodiment are explained mainly.

Figure 9:
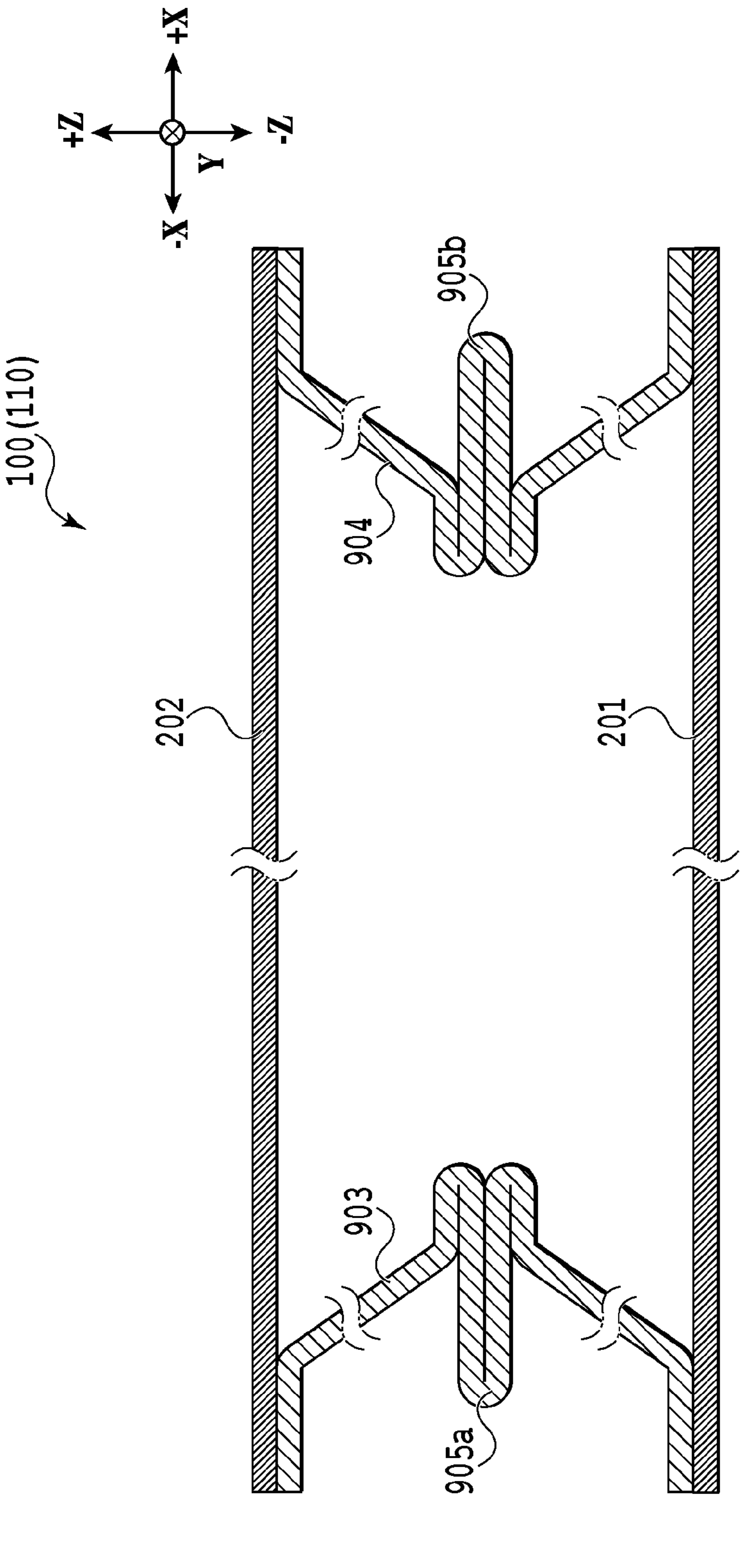
FIG. 9 is a schematic cross-sectional diagram of a liquid storage unit according to a third embodiment.

FIG. 9 is a schematic cross-sectional diagram of the liquid storage unit 100 according to the present embodiment. In the following, explanation is given on the assumption that the liquid storage unit 100 is cut by a cutting line corresponding to the VI-Vi line in FIG. 2. As shown in FIG. 9, the bag unit 110 according to the present embodiment has a seventh lateral face member 903, an eighth lateral face member 904, a first stopper portion 905*a*, and a second stopper portion 905*b*. The first stopper portion 905*a* is formed by the seventh lateral face member 903 being folded back. The second stopper portion 905*b* is formed by the eighth lateral face member 904 being folded back.

In a case where the stopper portion is formed, first, the joining margin is created by folding (referred to as "folding of the first time") the lateral face member from the inside of the bag unit 110 toward the outside. Following the above, after further causing the lateral face member to protrude to the outside of the bag unit 110, the lateral face member is folded back from the outside of the bag unit 110 toward the inside. Following the above, at the same position of the folding of the first time, the lateral face member is folded back again from the inside of the bag unit 110 toward the outside. In the present embodiment, the stopper portion is formed by folding the lateral face member from the inside of the bag unit 110 toward the outside at least twice and folding the lateral face member from the outside of the bag unit 110 toward the inside at least once. That is, in the present embodiment, the lateral face member is folded back at least three times.

Due to this, it is possible to cause the inside of the stopper portion to have a four-layer structure by using one lateral face member. The portions to be joined of the lateral face member are joined by thermal welding and the like as in the embodiments described above. After that, the bottom face portion 201, the top face portion 202, and the lateral face member are joined.

In the present embodiment, by forming the stopper portion by folding back one lateral face member, it is possible to reduce the number of parts. As described above, by causing the inside of the stopper portion to have a four-layer structure using one lateral face member, it is possible to provide the liquid storage unit 100 whose reliability is still higher than that and whose cost is still lower than that of the first embodiment.

Other Embodiments

In the first embodiment, the inner wall of the case main body 61*a* does not have a cushioning material, but it may also be possible to provide a cushioning material (for example, sponge member) to the inner wall of the case main body 61*a* in order to lessen an impact in a case where the stopper unit comes into contact with the inner wall of the case main body 61*a*.

In the first embodiment, the material configuring the stopper unit is the same as the material configuring the lateral face unit, but the material configuring the stopper unit may include a material different from that of the lateral face unit. Specifically, the material configuring the stopper unit may include a resin member (for example, polypropylene) whose hardness is higher than that of a film. According to the configuration such as this, it is possible to increase the strength of the stopper unit 505.

According to the liquid storage unit of the present disclosure, it is possible to suppress damage to a gusset portion without using a dedicated product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-063314, filed Apr. 6, 2022, which is hereby incorporated by reference wherein in its entirety.

What is claimed is:

1. A liquid storage unit, comprising:

a liquid storage portion internally storing liquid;

a gusset portion provided longitudinally in a lateral face unit of the liquid storage portion, the lateral face unit being configured by a first lateral face unit and a second lateral face unit, wherein the gusset portion includes a bent portion in which a connecting portion between the first lateral face unit and the second lateral face unit is a valley fold portion; and a stopper unit nipped between the first lateral face unit and the second lateral face unit at the connecting portion between the first lateral face unit and the second lateral face unit, the stopper unit protruding in a direction opposite to a direction in which the bent portion is bent.

2. The liquid storage unit according to claim 1, wherein the liquid storage portion has a bottom face portion and a top face portion facing the bottom face portion, wherein the first lateral face unit connects the bottom face portion, and wherein the second lateral face unit connects the top face portion.

3. The liquid storage unit according to claim 1, wherein the stopper unit is configured by bending the connecting portion inward and outward multiple times with a portion bent outward protruding further outward than a portion bent inward.

4. The liquid storage unit according to claim 1, wherein a material configuring the stopper unit includes a material different from that of a lateral face unit.

5. The liquid storage unit according to claim 4, wherein the stopper unit is configured by a material whose rigidity is higher than that of the lateral face unit.

6. The liquid storage unit according to claim 1, wherein the liquid storage portion is configured by a film having flexibility.

7. The liquid storage unit according to claim 1, wherein the liquid storage portion is contained in a case, and wherein the stopper unit contacts the inside of the case depending on the orientation of the case.

8. An ink ejection apparatus comprising:

an ink tank containing the liquid storage unit according to claim 1 in a case; and a mounting portion that is capable of mounting the ink tank.

* * * * *